US005573348A

United States Patent [19]

Morgan

[11] Patent Number: 5,573,348

[45] Date of Patent: *Nov. 12, 1996

[54] STRUCTURAL MEMBERS

[76] Inventor: J. P. Pat Morgan, P.O. Box 1089, St. George, Utah 84771

[ * ] Notice: The term of this patent shall not extend beyond the expiration date of Pat. No. 5,391,019.

[21] Appl. No.: 166,244

[22] Filed: Dec. 13, 1993

Related U.S. Application Data

[63] Continuation-in-part of Ser. No. 58,483, May 6, 1993, Pat. No. 5,391,019, which is a continuation-in-part of Ser. No. 757,813, Sep. 11, 1991, Pat. No. 5,209,603.

[51] Int. Cl.[6] .......... B65G 5/00

[52] U.S. Cl. .......... 405/52; 52/659; 264/256; 405/128; 588/259

[58] Field of Search .......... 405/128, 129, 405/52, 53; 52/659; 264/32, 34, 71, 256, 109; 588/249, 256, 257, 259

[56] References Cited

U.S. PATENT DOCUMENTS

| | | | |
|---|---|---|---|
| 14,273 | 2/1856 | Bartlett | 405/55 X |
| 3,378,617 | 4/1968 | Elmendorf | 264/256 X |
| 3,469,000 | 9/1969 | Smith | 264/256 X |
| 4,133,928 | 1/1979 | Riley et al. | 52/659 X |
| 4,372,906 | 2/1983 | del Valle | 264/256 |
| 4,450,128 | 5/1984 | Takeuchi | 264/256 X |
| 4,504,320 | 3/1985 | Rizer et al. | 106/708 |
| 4,565,840 | 1/1986 | Kobayashi et al. | 52/659 X |
| 4,708,745 | 11/1987 | Schonhausen | 264/246 X |
| 4,784,821 | 11/1988 | Leopold | 264/256 X |
| 4,834,929 | 5/1989 | Dehuff et al. | 264/256 X |
| 5,030,033 | 7/1991 | Heintzelman et al. | 405/52 |
| 5,037,239 | 8/1991 | Olsen et al. | 405/128 |
| 5,059,063 | 10/1991 | Sugimoto et al. | 405/132 X |

*Primary Examiner*—Dennis L. Taylor
*Attorney, Agent, or Firm*—Kenneth A. Roddy

[57] ABSTRACT

Improved structural members including solid and hollow core beams, poles, columns and enclosure structures formed of a cement-based slurry infiltrated fiber composite material. The improved structural members are produced by first placing a plurality of individual short fibers or fiber mats of organic or inorganic materials into a form to create a bed of fibers substantially filling the form and having a predetermined fiber volume density and then adding a cement-based slurry mixture into the form to completely infiltrate the spaces between the fibers. Existing structural members may be retrofitted with jackets of the cement-based slurry infiltrated fiber composite material. The cement-based slurry mixture includes a composition of Portland cement or blended cement, fly ash, water, a high-range water reducer (superplasticizer), and may also include fine grain sand, ground granulated blast-furnace slag, chemical admixtures, and other additives. Due to its fiber volume density and method of manufacture, the resulting structure has greater strength, less maintenance, and less cracking and deterioration than wood, steel, or conventional reinforced concrete and pre-stressed concrete structures, and a much higher bending capacity approximating that of structural steel.

23 Claims, 8 Drawing Sheets

FIG. 25
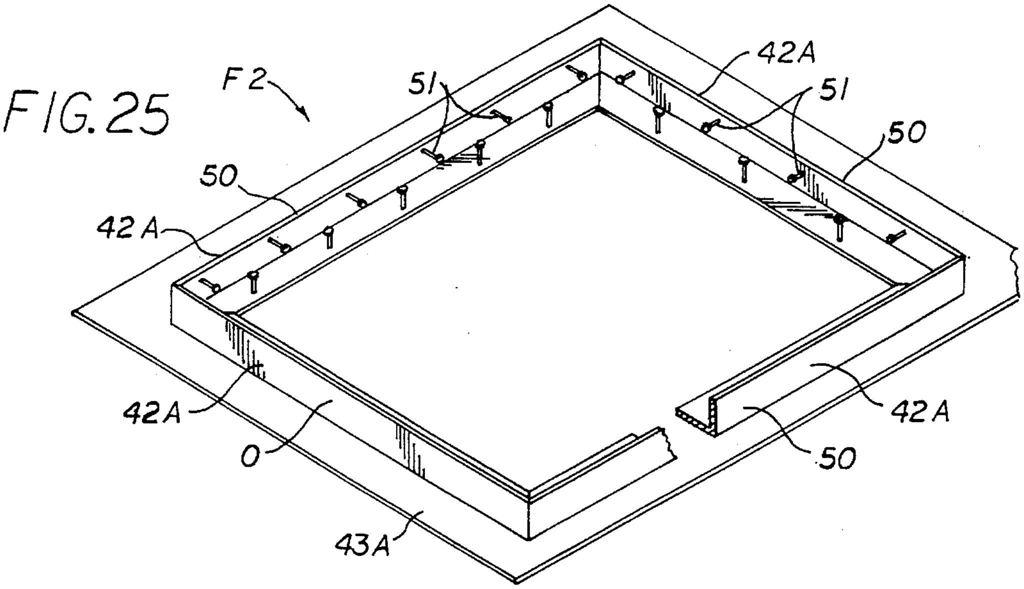
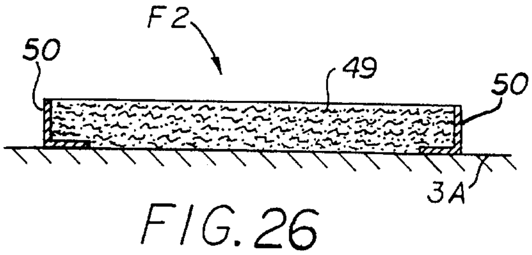
FIG. 26
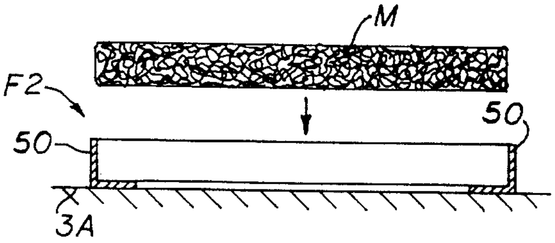
FIG. 27
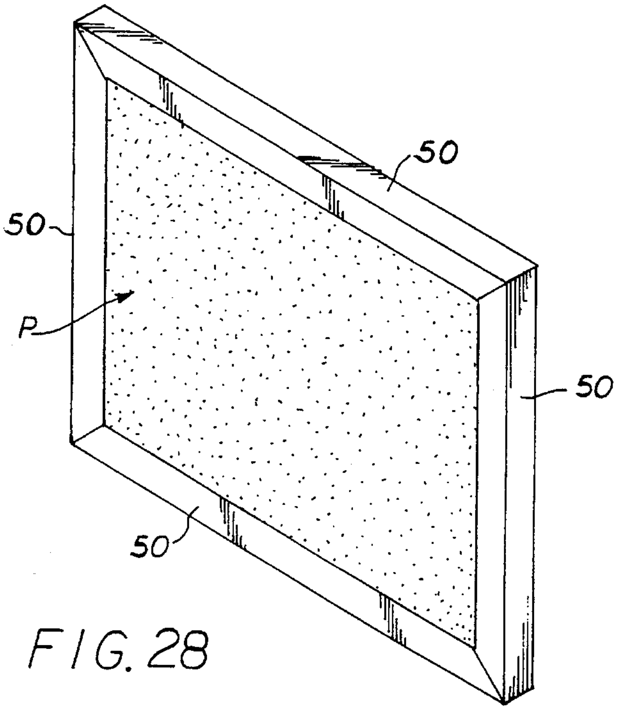
FIG. 28

STRUCTURAL MEMBERS

CROSS REFERENCE TO RELATED APPLICATION

This application is a continuation-in-part of U.S. patent application Ser. No. 08/058,483, filed May 6, 1993, now U.S. Pat. No. 5,391,019, which is a continuation-in-part of Ser. No. 07/757,813, filed Sep. 11, 1991, now U.S. Pat. No. 5,209,603.

BACKGROUND OF THE INVENTION

1. Field of the Invention

This invention relates generally to structural members, and more particularly to improved solid or hollow core structural members formed of a cement-based slurry infiltrated fiber composite material wherein the walls of the structural member contains a mass of short fibers or fiber mats of organic or inorganic materials having a predetermined fiber volume density completely infiltrated in a cement-based matrix mixture.

2. Brief Description of the Prior Art

Structural beams, columns, and poles, such as; railroad ties for supporting steel railroad tracks, telephone and utility poles, bridge or highway overpass support beams and columns, pilings for building foundations and piers, and culverts, are usually constructed of wood, reinforced concrete, pre-stressed concrete, metal, or fiberglass.

Environmental enclosure structures such as: secondary containment vaults for hazardous materials; underground storage vaults; controlled environment vaults for housing communication security vaults for storing volatile explosives, nuclear weapons, test devices, weapons components, and radioactive wastes, are usually fabricated using conventional reinforced and pre-stressed concrete.

Since the early 1800's, railroad ties and telegraph poles have been made from wood. In the early 1970's, the precast pre-stressed concrete tie was introduced commercially by Costain Concrete Tie Company in Alberta, Canada, and shortly thereafter in the United States. In 1986, the company relocated to Spokane, Wash. and changed their name to CXT, Inc. Concrete ties have been gaining popularity among railroad companies since their inception in 1971. Also in the early 1970's, concrete telephone and utility poles were commercialized by Centrecon (American Pole Products) of Evererett, Wash.

Demand for wood-alternative structural members has steadily increased due to rising timber prices and environmental restructions. With the recent (1993) cut-back in federal timber sales in the Northwest, the use of wood as a structural material will drop substantially in the nineties. Timber prices are projected to rise 35% in 1993 and an additional 10% in 1994.

Conventional structural members formed of wood or concrete are subject to cracking and deterioration because of environmental changes, such as freeze-thaw and/or moisture-heat cycles. These same conditions cause steel structural members to rust or corrode. In the case of telephone and utility poles, wind conditions will adversely affect the wood, concrete or steel structures because they are subjected to vibration and bending movements (and earthquakes in some areas) which cause cracking, spalling, and deterioration. In the case of railroad ties, abrasion occurs on the bottom side of the ties due to particles of hard material, such as locomotive traction sand, which is 10 times the hardness of hydrated cement. This condition prematurely wears out the concrete ties.

Also, concrete railroad ties and most other concrete structures have an alkali-aggregate reaction which results from certain types of silica in the aggregate reacting with alkalis in the cement to form a gel. The gel absorbs water, from the air or ground and swells, thus causing severe crazing, followed by expansion of the concrete and severe cracking. In pre-stressed concrete structures, the result is loss of bond and, hence, pre-stress, which leads to structural failure.

Earthquakes can cause failure of pre-stressed concrete support beams and columns. For example, in the San Francisco freeway disaster in 1990 the bridge and highway overpass support beams and columns collapsed due to very low flexural properties, and resulted in the loss of life and millions of dollars in damages.

In the past, materials such as petroleum products, chemicals, and hazardous materials have been stored in large metal or fiberglass tanks which are buried underground. Most of these "underground fuel storage tanks" (UFST) are prone to leakage due to being subjected to the hydrostatic forces of ground water, physical stresses associated with ground movement, and the corrosive action of soil environments. Great damage to the environment and personal injury often results when the leaked materials enter the soil or ground water. The United States Environmental Protection Agency. (EPA) has recently adopted regulations for Underground Fuel Storage Tanks (UFST) in response to the growing awareness of the damage caused by releases from the UFST's.

One method to comply with the EPA regulations is to place the fuel storage tank inside a buried "secondary containment vault" which allows the tank to be monitored for leakage and, in the event of a leak, will contain the leak to prevent the material from entering the soil or ground water. The secondary containment vault also isolates the fuel tank from soil and hydrostatic pressures and the corrosive action of many soils. Most underground secondary containment vaults currently available are fabricated using conventional reinforced and pre-stressed concrete. To meet the structural design requirements for resisting hydrostatic loads and soil pressures, the walls of the vaults are generally from 8 to 10 inches thick.

Other structures, such as controlled environment vaults and high security vaults are usually fabricated using conventional reinforced and pre-stressed concrete. The controlled environment vault is a box-like structure used for housing communication equipment, such as telephone, computer, or surveillance equipment, etc., and may contain temperature control equipment, dehumidifiers, fresh air blowers, environment monitors and alarms, and electrical control panels and outlets, etc. to provide a controlled environment. The controlled environment vaults may be partially buried with an entry hatch above ground. Controlled environment vaults range in size from about 17'–25' in length, 7'–12' in height, and 10'–12' in width. A controlled environment vault of conventional steel reinforced concrete in the smaller size has a weight of 70,000 lbs, and the larger size weighs about 140,000 lbs, with a concrete strength of 5,000 psi. The high security vault is a box-like structure used for storing volatile explosives, nuclear weapons, test devices, weapons components, and radioactive wastes, where high strength and security is a factor.

Utility Vault Company, Inc., of Chandler, Ariz. manufactures secondary containment vaults, and controlled environment vaults which are constructed of conventional steel reinforced concrete.

There are several patents which disclose various fiber reinforced concrete structures.

U.S. Pat. No. 3,429,094 to Romualdi discloses a two-phase concrete and steel material comprising closely spaced short wire segments uniformly distributed randomly in concrete wherein the average spacing between wire segments is not greater than 0.5 inches.

Fleischer et al, U.S. Pat. No. 4,257,912 discloses a system for fixed storage of spent nuclear fuel having activated fission products contained within a metallic fuel rod housing which comprises a uniform concrete contiguously and completely surrounding the metallic housing which has metallic fibers to enhance thermal conductivity and polymers to enhance impermeability for convectively cooling the exterior surface of the concrete.

Rotondo et al, U.S. Pat. No. 4,404,786 discloses a method and apparatus for making reinforced concrete products including hollow poles wherein arrays of reinforcing rods are distributed and embedded automatically during the introduction of concrete into a form.

Lankard et al, U.S. Pat. No. 4,559,881 discloses a burglar resistant security vault formed of prefabricated steel fiber reinforced concrete modular panels wherein Portland Cement, fly ash, fine aggregate, gravel and water are mixed for an extraordinarily long period of time and they remain a mass of crumbly, damp, powder and aggregate until the superplasticizer admixture is added, at which time the mixture reaches a fluid state. Steel fibers are then added to the mixture and mixing continues until the mixture including the steel fibers is poured into a mold cavity.

Double et al, U.S. Pat. No. 4,780,141 discloses a cementious composite material containing metal fiber which particularly formulated to have high strength and a high degree of vacuum integrity at high temperatures. The composite comprises a high strength cement matrix and a filler component comprising a metal fiber having a length of about 0.05 mm. to about 5 mm. (about 0.02" to about 0.20"). The metal fiber filler is mixed with the cement matrix at a high vacuum to minimize air bubbles and then the liquid mixture (including metal fiber) is poured into the mold.

Heintzelman et al, U.S. Pat. No. 5,030,033 discloses a conventional concrete underground storage vault comprised of a plurality of concrete sections sealingly secured together with grout keys and joint wrap. A fluid and material resistant (epoxy) coating is applied to the interior surfaces and an inert gas atmosphere is maintained within the vault to inhibit influx of oxygen and moisture. There is no teaching in Heintzelman of the type of concrete used, other than "pre-cast concrete" or "steel and/or concrete".

Riley et al, U.S. Pat. No. 4,133,928 discloses a composite cementious or gypsum matrix material having precombined absorbent fibres and reinforcing fibre embedded therein. The absorbent fibres are selected from the group consisting of cotton, wool, cellulose, viscose rayon, and cuprammonium rayon, with the reinforcing fibers being selected from the group consisting of glass, steel, carbon, polyethylene and polypropylene. The fibre combinations are impregnated with portland cement or gypsum. Riley et al teaches a steel wire/cotton yarn reinforced concrete made by loom weaving a tape or felt having ten ends per inch for each fibre in both the longitudinal (warp) and cross (weft) directions then passing the tapes through a portland cement mortar slurry consisting of one part water, two parts cement, three parts sand by weight, and then winding the tapes into a mold and placing the mold in a curing room for one month.

As described hereinafter, the present invention utilizes a "cement-based slurry infiltrated fiber composite" construction which is significantly different from conventional "steel bar reinforced concrete", "steel fiber reinforced concrete", and "pre-stressed concrete", in both its fiber volume density and in the manner in which it is made. The "cement-based slurry infiltrated fiber composite" described hereinafter overcomes the disadvantages of conventional concrete structural members and produces a structure which has thinner walls and a gross weight significantly less than conventional reinforced and pre-stressed concrete structures of the same size and has the same or greater strength characteristics, and a much higher bending capacity approximating that of structural steel The present invention is distinguished over the prior art in general, and these patents in ' particular by improved structural members including solid and hollow core beams, poles, columns and enclosure structures which are formed of a cement-based slurry infiltrated fiber composite material. The improved structural members are produced by first placing a plurality of individual short fibers or fiber mats of organic or inorganic materials into a form to create a bed of fibers substantially filling the form and having a predetermined fiber volume density and then adding a cement-based slurry mixture into the form to completely infiltrate the spaces between the fibers. Existing structural members may be retrofitted with jackets of the cement-based slurry infiltrated fiber composite material. The cement-based slurry mixture includes a composition of Portland cement or blended cement, fly ash, water, a high-range water reducer (superplasticizer), and may also include fine grain sand, ground granulated blast-furnace slag, chemical admixtures, and other additives. Due to its fiber volume density, and method of manufacture, the resulting structure has greater strength, less maintenance, and less cracking and deterioration than wood, steel, or conventional reinforced concrete and pre-stressed concrete structures, and a much higher bending capacity approximating that of structural steel.

SUMMARY OF THE INVENTION

It is therefore an object of the present invention to provide improved structural members including solid and hollow core beams, poles, columns and enclosure structures formed of a cement-based slurry infiltrated fiber composite material.

It is another object of this invention is to provide an improved structural member formed of a cement-based slurry infiltrated fiber composite material which is highly resistant to cracking, spalling, deterioration, rust and corrosion because of environmental changes, such as freeze-thaw and/or moisture-heat cycles.

Another object of this invention is to provide an improved structural member formed of a cement-based slurry infiltrated fiber composite material which is highly resistant to strong winds, vibration, and earthquakes.

Another object of this invention is to provide an improved structural member formed of a cement-based slurry infiltrated fiber composite material which is highly resistant to abrasion and wear by particles of hard material.

Another object of this invention is to provide an improved structural member formed of a cement-based slurry infiltrated fiber composite material which is highly resistant to absorbtion of water from the air or ground due to alkali-aggregate reaction.

Another object of this invention is to provide an improved structural member formed of a cement-based slurry infiltrated fiber composite material which has greater strength, less maintenance, and less cracking and deterioration than wood, steel, or conventional reinforced concrete and pre-stressed concrete structures, and a much higher bending capacity approximating that of structural steel.

Another object of this invention is to provide an improved structural member formed of a cement-based slurry infiltrated fiber composite material which can be used as an alternative to conventional structural beams, columns, and poles which are usually constructed of wood, steel, reinforced concrete, pre-stressed concrete, metal, or fiberglass such as; railroad ties for supporting railroad tracks, telephone and utility poles, culverts, bridge or highway overpass support beams and columns, pilings for building foundations and piers.

Another object of this invention is to provide a structural member which can be formed around existing conventional structural members such as; structural beams, columns, poles, bridge or highway overpass support beams and columns, pilings for building foundations and piers, etc., to repair, reinforce, rehabilitate, or upgrade existing structures in a "retrofitting" procedure.

A further object of this invention is to provide an improved environmental enclosure structure formed of a cement-based slurry infiltrated fiber composite material which has thinner walls, greater strength, and a gross weight significantly less than conventional reinforced and pre-stressed concrete structures of the same size.

A still further object of this invention is to provide an improved cement-based slurry infiltrated fiber composite material and method of manufacturing improved structural members such as; solid and hollow core beams, poles, columns, enclosure structures, etc.

Other objects of the invention will become apparent from time to time throughout the specification and claims as hereinafter related.

The above noted objects and other objects of the invention are accomplished by the improved structural members in accordance with the present invention including solid and hollow core beams, poles, columns and enclosure structures which are formed of a cement-based slurry infiltrated fiber composite material. The improved structural members are produced by first placing a plurality of individual short fibers or fiber mats of organic or inorganic materials into a form to create a bed of fibers substantially filling the form and having a predetermined fiber volume density and then adding a cement-based slurry mixture into the form to completely infiltrate the spaces between the fibers. Existing structural members may be retrofitted with jackets of the cement-based slurry infiltrated fiber composite material. The cement-based slurry mixture includes a composition of Portland cement or blended cement, fly ash, water, a high-range water reducer (superplasticizer), and may also include fine grain sand, ground granulated blast-furnace slag, chemical admixtures, and other additives. Due to its fiber volume density and method of manufacture, the resulting structure has greater strength, less maintenance, and less cracking and deterioration than wood, steel, or conventional reinforced concrete and pre-stressed concrete structures, and a much higher bending capacity approximating that of structural steel.

BRIEF DESCRIPTION OF THE DRAWINGS

FIGS. 25, 26, 27, and 28, are schematic illustrations showing various stages in the method of forming the panel for a modular structure.

DESCRIPTION OF THE PREFERRED EMBODIMENTS

Figure 1:
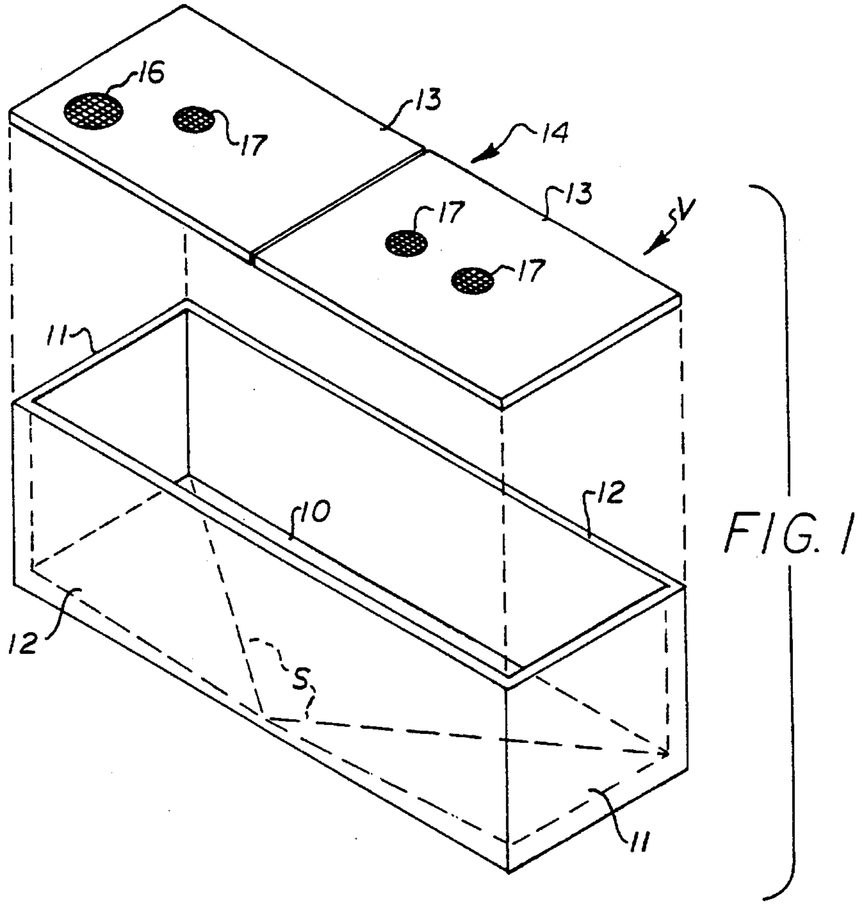
FIG. 1 is an exploded isometric view of a secondary containment vault enclosure in accordance with the present invention.
Figure 2:
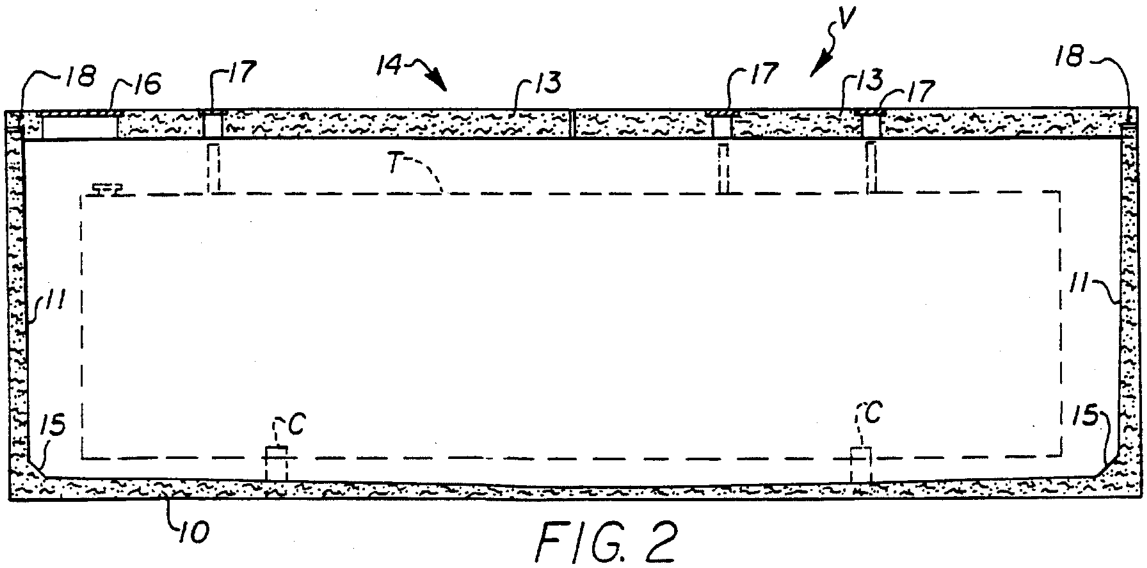
FIG. 2 is longitudinal cross section of the secondary containment vault of FIG. 1.
Figure 3:
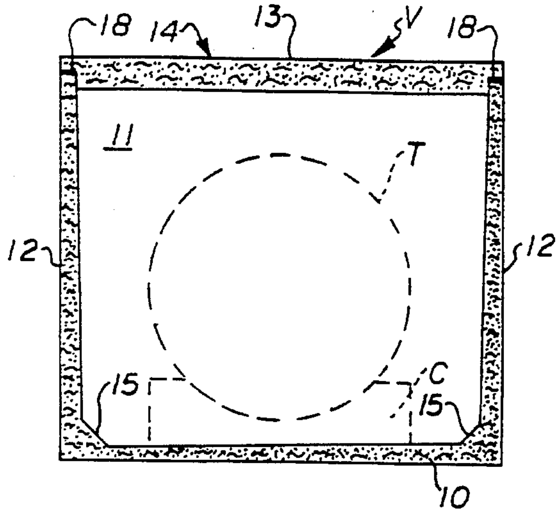
FIG. 3 is a transverse cross section of the secondary containment vault of FIG. 1.

Referring to the drawings by numerals of reference, there is shown in FIGS. 1, 2, and 3, a preferred secondary containment vault V. The vault V is a box-like structure which may be buried underground or may be used above ground. The preferred vault is a monolithic structure having a bottom wall 10, opposed end walls 11, and opposed side walls 12. A plurality of separate panels 13 form the roof slab 14. A vault in accordance with the present invention used for protecting fuel tanks may typically be approximately 10 feet tall, 12 feet wide, and 32 feet in length. However, it should be understood that the vault may be made in various sizes depending upon the particular application and a single roof slab may be used.

In the example illustrated, a fuel storage tank T is placed inside the vault V and supported above the floor 10 on cradles C. The vault has an interior volume greater than the capacity of the tank it contains such that in the event a leak should occur, the secondary containment vault V will completely contain the leaked materials.

The inside corners 15 at the juncture of the bottom wall 10 and the walls 11 and 12 of the vault V may be angled approximately 45° for a distance of about 6" above, the bottom wall. As represented in dotted line S in FIG. 1, the top surface of the bottom wall 10 slopes from each end wall 11 and one side wall 12 inwardly and toward the opposed side wall to facilitate drainage of any leaked material.

The panels 13 forming the roof 14 are placed on top of the open end of the vault V and may be provided with various apertures, such as manhole access ports 16 which allow access to the interior by workers to conduct testing or other operations inside the vault. The panels 13 may also be provided with additional apertures 17 to access various fittings on the primary tank, such as monitoring equipment, vapor recovery tubes, drop tubes, gauging tubes, and pump manifolds, etc. The apertures are provided with cover plates. Suitable seals or gaskets 18 are installed between the top surface of the walls 11-12 and the bottom surface of the panels 13.

Because the vault V is made of a cement-based slurry infiltrated fiber composite material (described hereinafter), its total weight is substantially less than conventional reinforced or pre-stressed concrete structures of the same :size.

Figure 4:
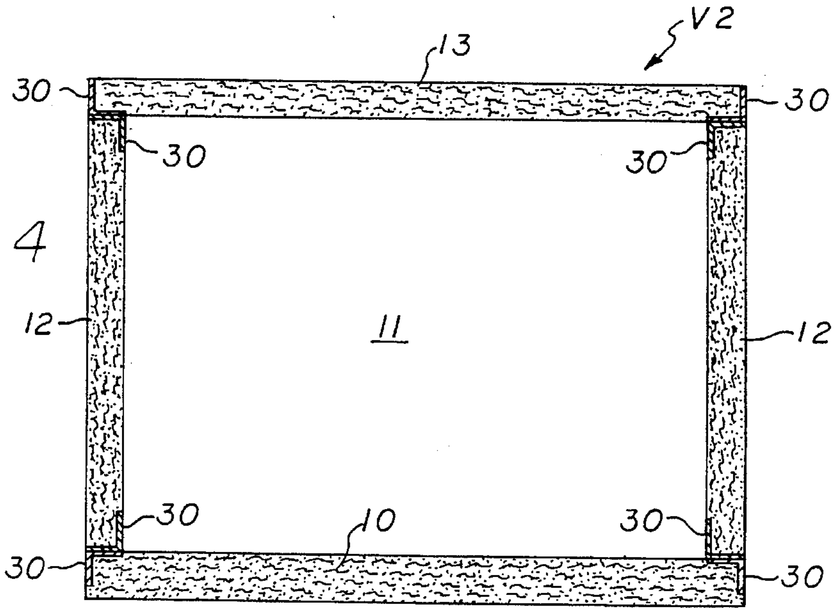
FIG. 4 is a transverse cross section of an alternate embodiment of a modular enclosure constructed of panels.
Figure 5:
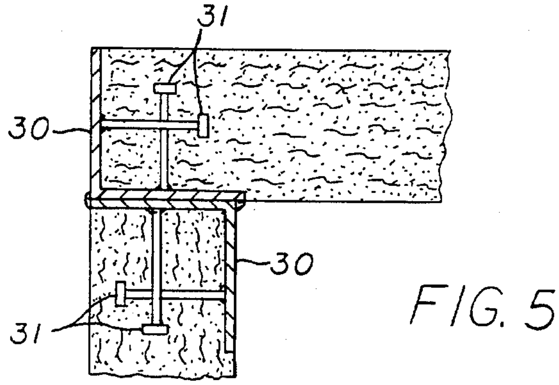
FIG. 5 is a detail in cross section of a corner joint of the modular panels of FIG. 6.

Alternatively, as seen in FIGS. 4 and 5, the enclosure vault V2, or other structure, may be formed of individual precast panels of the cement-based slurry infiltrated fiber composite material and connected together at the installation site. The bottom Wall 10, end walls 11, and side walls 12 are formed (described hereinafter) with L-shaped longitudinal metal angles 30 placed in the form prior to infiltrating the fibers with the cement-based slurry, such that the angles 30 form the corners or edges of the panels which are to be connected by welding, bolting or other means. The metal angles 30 are provided with headed anchor studs 31 which extend inwardly to become securely imbedded in the concrete when it cures (FIG. 5).

Various other enclosure structures may be formed of the cement-based slurry infiltrated fiber composite material, such as controlled environment vaults used for housing communication equipment, such as telephone, computer, or surveillance equipment, etc., which requires a controlled environment for proper operation. The controlled environment vaults may be partially buried with an entry hatch above ground.

An added feature of the enclosure structures is that the cement-based slurry infiltrated fiber composite material will block radio transmission waves, thereby increasing security and perhaps reducing health risks.

High security utility buildings and explosion resistant vaults may also be formed of cement-based slurry infiltrated fiber composite material which can be used for storing volatile explosives, weapons, radioactive wastes, or other purposes where high-strength and security is a factor. A utility building formed of the cement-based slurry infiltrated fiber composite material is substantially impenetrable (bullet-proof) and explosion resistant, and may be installed above ground and provided With steel doors and a steel roof. Explosion resistant vaults are provided with an explosion relief roof or lid and may be used for storing fuel tanks, volatile explosives, nuclear weapons, test devices, and weapons components.

Although the illustrated examples of the environmental enclosure structure is shown as a box-like configuration, it should be understood that the structures may be cylindrical or various other shaped configurations. Straight or curved panels or combinations thereof can be used for roof panels and wall panels in various structures.

Figure 6:
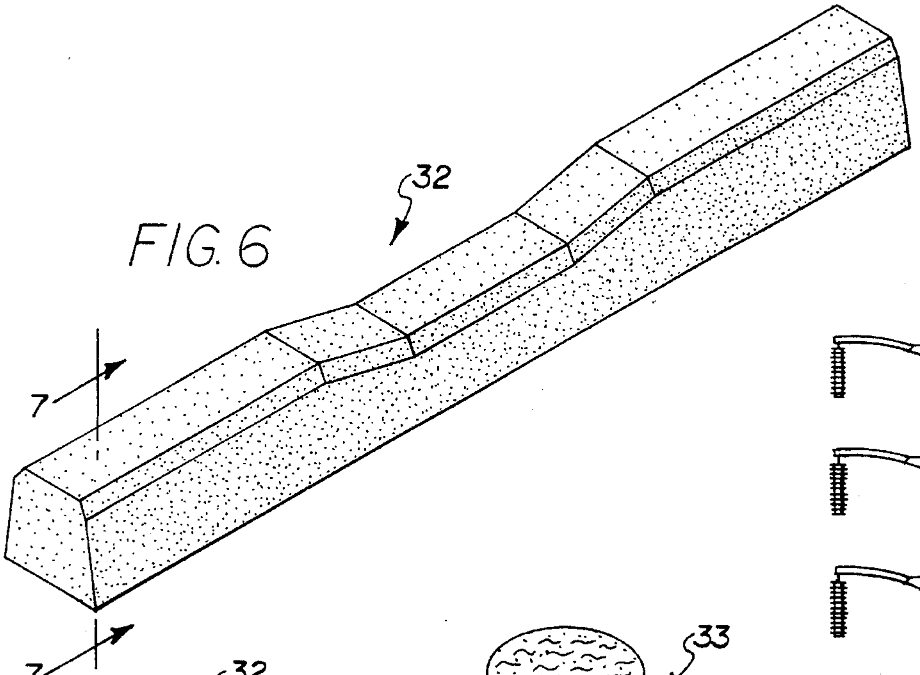
FIG. 6 is an isometric view of a rectangular structure such as a railroad tie formed of cement-based slurry infiltrated fiber composite material.
Figure 7:
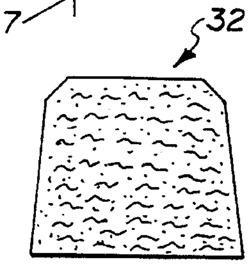
FIG. 7 is a cross section of the rectangular structure of FIG. 6.

FIGS. 6 and 7 show a railroad tie 32 formed of cement-based slurry infiltrated fiber composite material. The railroad tie 32 is approximately 8'–6" long, 8"–12" wide, and 6"–9" tall and may have fasteners molded in the surface which accept a variety of standard fastening systems. Conventional concrete and pre-stressed concrete railroad ties are more brittle than wood ties. They are also subject to abrasion on the bottom side of the ties due to particles of hard material, such as locomotive traction sand, which is 10 times the hardness of hydrated cement, creeping under the pads during the passage of trains, and hydraulic pressure. The component in concrete vunerable to this problem has been attributed to the cement matrix. The abrasion prematurely wears out conventional concrete ties. Conventional concrete railroad ties also are subject to an alkali-aggregate reaction which results from certain types of silica in the aggregate reacting with alkalis in the cement to form a gel. The gel absorbs water from the air or ground and swells, thus causing severe crazing, followed by expansion of the concrete and severe cracking. In pre-stressed concrete ties, the result is loss of bond and, hence, pre-stress, which leads to structural failure.

The improved railroad tie 32 formed of cement-based slurry infiltrated fiber composite material (described hereinafter) contains a uniform continuous mass of individual interlocked fibers or fiber mats of organic or inorganic materials completely infiltrated by and embedded in a cementious matrix mixture of Portland cement or blended cement, fly ash, water, and a water-reducing superplasticizer and has a fiber volume density in the range of from about 2% to about 25%,. Due to its fiber volume density, such a structure greatly reduces the problems associated with conventional concrete ties and provides greater strength, less maintenance, less cracking and deterioration, and a much higher bending capacity approximating that of structural steel.

Figure 8:
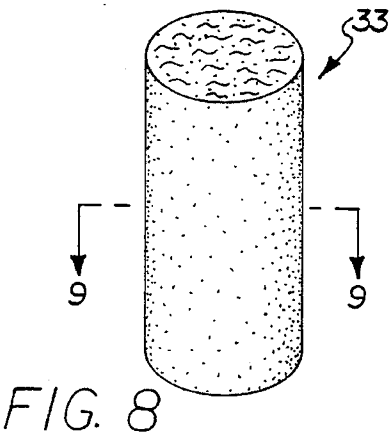
FIG. 8 is a perspective view of a cylindrical structure formed of cement-based slurry infiltrated fiber composite material.
Figure 10:
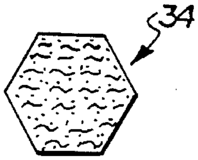
FIG. 10 is a transverse cross section through a column structure which has a non-cylindrical cross section.
Figure 9:
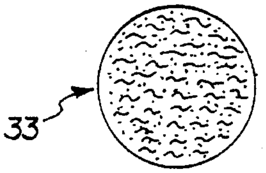
FIG. 9 is a cross section of the cylindrical structure of FIG. 8.
Figure 11:
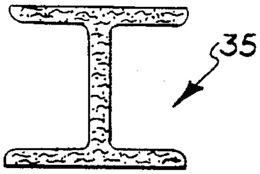
FIG. 11 is a transverse cross section through an I-beam formed of cement-based slurry infiltrated fiber composite material.

FIGS. 8 and 9 show a solid cylindrical pillar or column structure 33 formed of the cement-based slurry infiltrated fiber composite material. The cylindrical structure 33 may be formed in various diameters and lengths, and may be tapered, depending upon the particular application. Such structures may be used as posts, columns, bridge or highway overpass support beams and columns, and pilings for building foundations and piers, etc. FIG. 10 is a transverse cross section through a column structure 34 which has a non-cylindrical transverse cross section. FIG. 11 shows a transverse cross section through an I-beam 35 formed of the cement-based slurry infiltrated fiber composite material.

Figure 12:
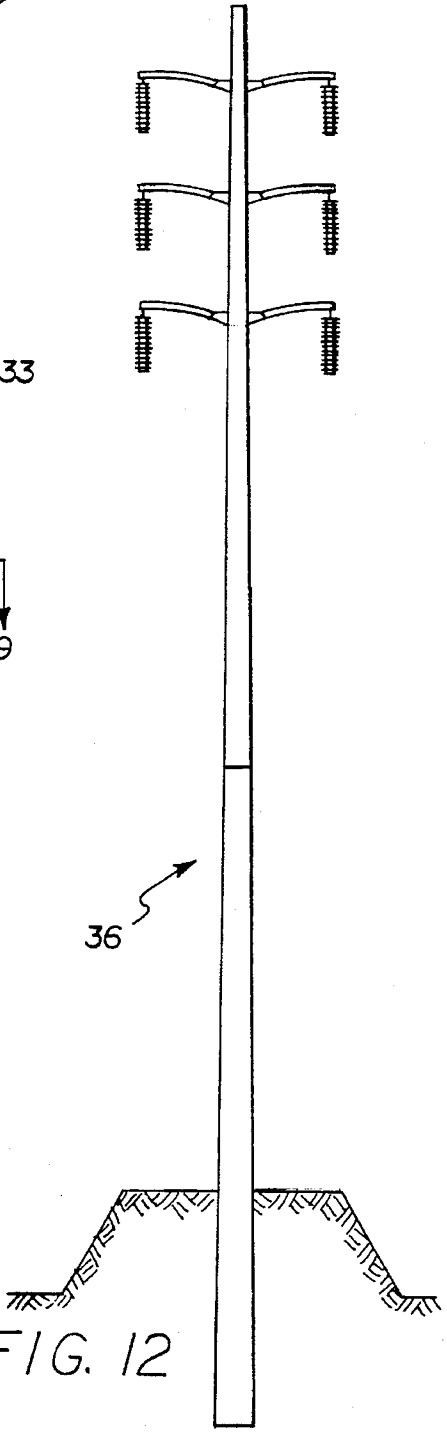
FIG. 12 is an elevational view of an elongate utility pole formed of cement-based slurry infiltrated fiber composite material.
Figure 13:
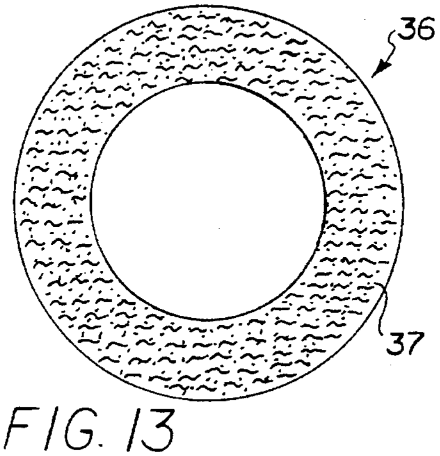
FIGS. 13 and 14 are transverse and longitudinal cross sections, respectively, of a hollow cylindrical structure such as a pole formed of the cement-based slurry infiltrated fiber composite material.
Figure 14:
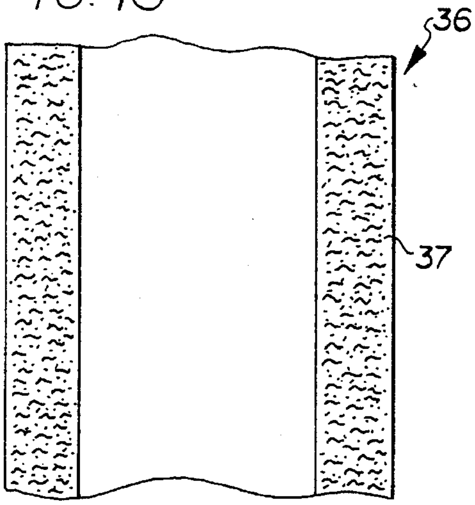

FIG. 12 shows an elongate utility pole 36 formed of the cement-based slurry infiltrated fiber composite material. The pole structure may be formed in various diameters and lengths, and may be tapered, depending upon the particular application. For example, most utility poles may range from about 60" to about 100" in length, and some may be as much as 250" in length. As shown in FIGS. 13 and 14, the poles 36 may be hollow having a side wall 37 which contains a uniform continuous mass of individual interlocked fibers or fiber mats of organic or inorganic materials completely infiltrated by and embedded in a cementious matrix mixture of Portland cement or blended cement, fly ash, water, and a water-reducing superplasticizer and has a predetermined fiber volume density in the range of from about 2% to about 25%.

Figure 15:
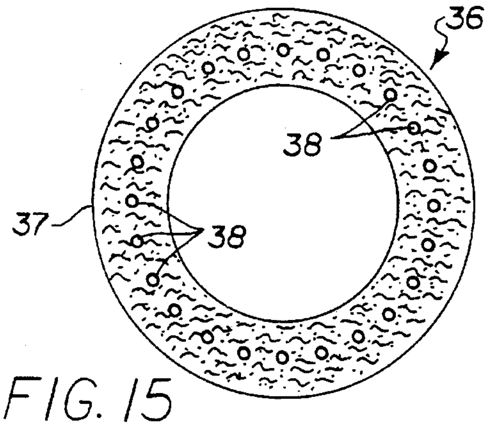
FIGS. 15 and 16 are transverse and longitudinal cross sections, respectively, of a hollow cylindrical structure such as a pole having a side wall which contains longitudinally extending reinforcing steel wire or re-bar in combination with the cement-based slurry infiltrated fiber composite material.
Figure 16:
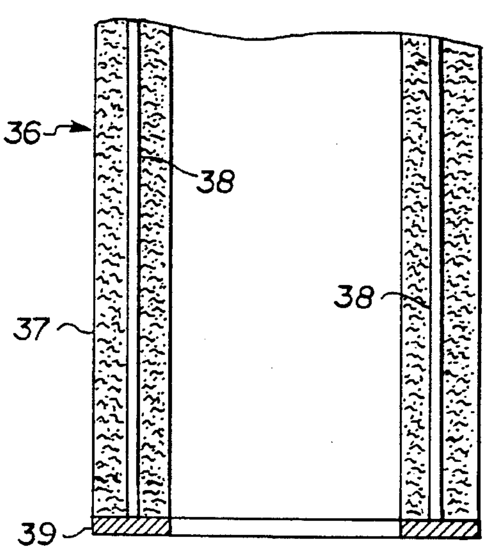

As shown in FIGS. 15 and 16, the side wall 37 of the poles 36 may also contain longitudinally extending reinforcing steel wire or re-bar 38 in combination with the mass of individual interlocked fibers or fiber mats of organic or inorganic materials completely infiltrated by and embedded the cementious matrix described above. It should be understood that this combination may also be used in posts, columns, bridge or highway overpass support beams and columns, culverts, and pilings for building foundations and piers, etc., in various shapes. Various fasteners may also be molded in the surface which accept a variety of standard fastening systems. Steel end plates 39 may also be provided at the ends of the structure which can be welded to the ends of re-bar 38 or steel wires and/or cast into the material when it is formed (described hereinafter).

Figure 17:
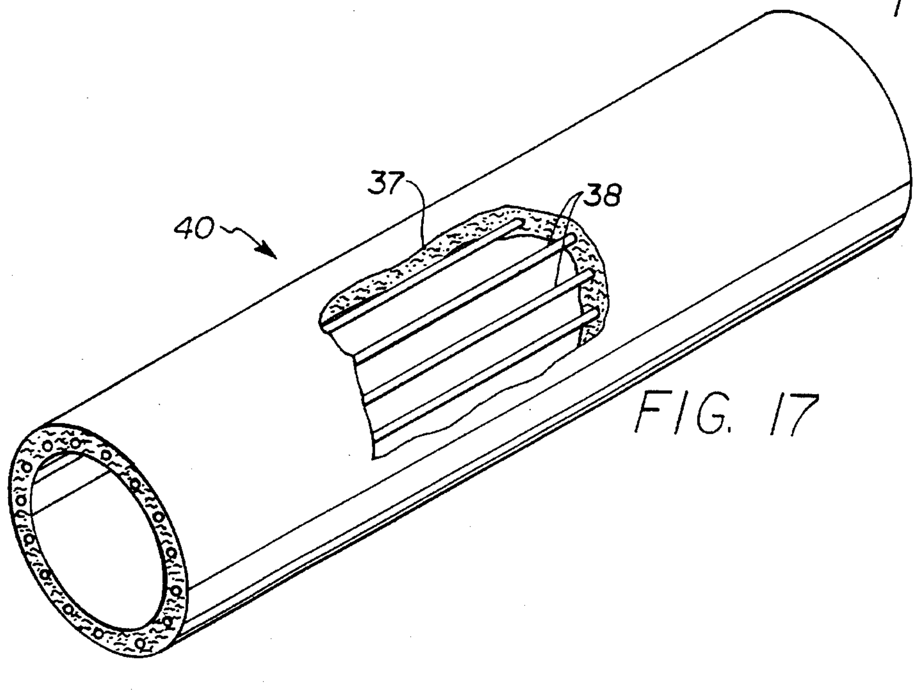
FIG. 17 is an isometric view of a hollow cylindrical pipe having a side wall which contains longitudinally extending reinforcing steel wire or re-bar in combination with the cement-based slurry infiltrated fiber composite material.
Figure 18:
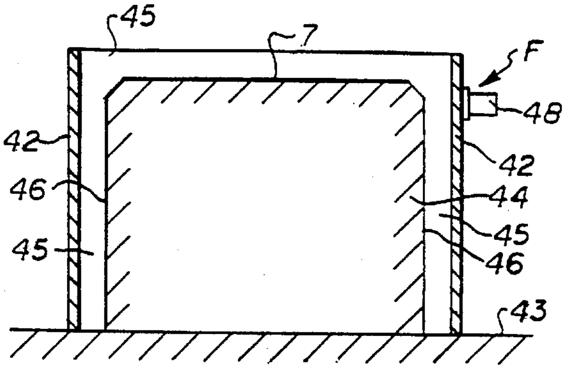
FIGS. 18, 19, 20, 21, 22, and 23 are cross sections illustrating schematically various stages in the method of forming a box-like structural member.

FIG. 17 shows a hollow cylindrical pipe 40 having a side wall 37 which contains longitudinally extending reinforcing steel wire or re-bar 38 in combination with the mass of individual interlocked fibers or fiber mats of organic or inorganic materials completely infiltrated by and embedded the cementious matrix described above.

MATERIALS OF CONSTRUCTION

The preferred environmental enclosure structures and structural members are made of a cement-based slurry infiltrated fiber composite material similar to a material known as "SIFCON", a relatively new concrete composite being developed by the New Mexico Engineering Research Institute of the University of New Mexico in Albuquerque, N.M. (NEMERI). SIFCON utilizes short steel fibers in a Portland cement based matrix. It should be noted that "SIFCON" and the present invention differ significantly from conventional "steel fiber reinforced concrete" (SFRC), as explained below.

In the conventional "steel fiber reinforced concrete" (SFRC) process, the steel fibers are added directly to a typical concrete mix in the ratio of 0.5% to 1.5% by volume. In contrast, the process in accordance with the present invention starts with a bed of pre-placed steel fibers in the range of from about 2% to about 25% by volume and then infiltrates the dense fiber bed with a low viscosity, cement-based slurry composition.

The steel fibers used in the present environmental enclosure structures and structural members are manufactured from drawn wire or cut from thin steel sheets. The steel fibers may be provided in several different lengths and diameters, and may have some type of deformation to aid in mechanical bonding. The present environmental enclosure structures may utilize a bed of pre-placed steel fibers in the range of from about 2% to 25% by volume, with the preferred fiber volume density being in the range of about 3% to 10% by volume, and in some applications, from about 5% to 10%. Each fiber is preferably approximately 2.36" long and 0.03" in diameter with a deformed end. The preferred cement-based slurry ingredients are Portland cement or blended cement, fly ash, and water, and a fine sand may be included. Ground granulated blast-furnace slag or a mixture of ground blast furnace slag and Portland cement may be used as a blended cement for the slurry. In addition, a high-range water reducer or "superplasticizer" is used to increase the fluidity of the slurry. The term "superplasticizer" as used herein is known in the art as a highly efficient admixture which is added to cement compositions to improve the workability, strength, and accelerate the set time of a concrete, mortar, or grout product, and suitable superplasticizers are commercially available under various brand names. Other ingredients, such as microsilica (silica fume), latex modifiers, polymers, and other common concrete additives may be used in the cement-based mixes.

The bed of fibers may also be formed of one or more blankets or mats of generally continuous strands of fibrous material having a fiber volume density in the range of from about 2% to about 25%, with the preferred fiber mat having a fiber volume density of from about 3% to 10% or from about 5% to 10% and each strand of the fibrous material approximately 0.008" to 0.030" in diameter. The length of the strands in the mats may range from about 4" to 30".

The resulting "cement-based slurry infiltrated fiber" and "fiber mat" composite structure has a much higher compressive strength, toughness, and ductibility than conventional concrete. The "cement-based slurry infiltrated fiber" and "fiber mat" composite structure has compressive strengths in the range of 10,000 to 30,000 psi and it's shear and flexural capacity is generally 10 to 20 times higher than conventional concrete.

The present environmental enclosure structures and structural members may also be made of a cement-based slurry infiltrated fiber composite material which utilizes short fibers or fibrous mats of other organic or inorganic material such as; other metals, glass, plastics, aramids, carbon, and boron, or combinations thereof. In some applications, the structures may also be made of a cement-based slurry infiltrated fiber composite material which utilizes short fibers or fibrous mats of epoxy-coated steel fibers.

As with the steel fibers, the organic and/or inorganic fibers or fiber mats are placed to form a bed of fibers in the range of from about 2% to 25% by volume and then infiltrated with a low viscosity, cement-based slurry. The cement-based slurry may also include: refractory castables, castable plastics and epoxies, or clay based slurries.

METHOD OF MANUFACTURE

Referring now to FIGS. 18 through 24, there is shown a typical wood or steel mold or form F which is used to form a structure having four side walls 42 joined together to form a hollow rectangular or square box construction open at the top and bottom ends which is supported on a flat surface 43. The side walls 42 are spaced outwardly from a central box-like core member 44 and extend above the core to form a cavity 45 surrounding the sides and top end of the core. Since the cement-based slurry has a relatively low viscosity, all joints and holes should be sealed with caulking or other sealing material to insure that the form is watertight.

It should be understood that the core member 44 may be shaped in any suitable configuration to form the interior of the product to be molded. However, for purposes of illustration and discussion, the core member 44 is shown to be a square box-like construction having four opposed side walls 46 and a top end wall 47, and the product to be formed by the present method will be described as a simple box configuration, such as those used forming the vault depicted in FIG. 1.

Small pneumatic vibrators 48 of the type used on bulk cement hoppers, spaced about 6 ft. on centers on one side of the form may optionally be used when forming walls up to 8 inches thick. For thicker walls, small vibrators on both sides of the wall or larger external form vibrators could be used.

Figure 19:
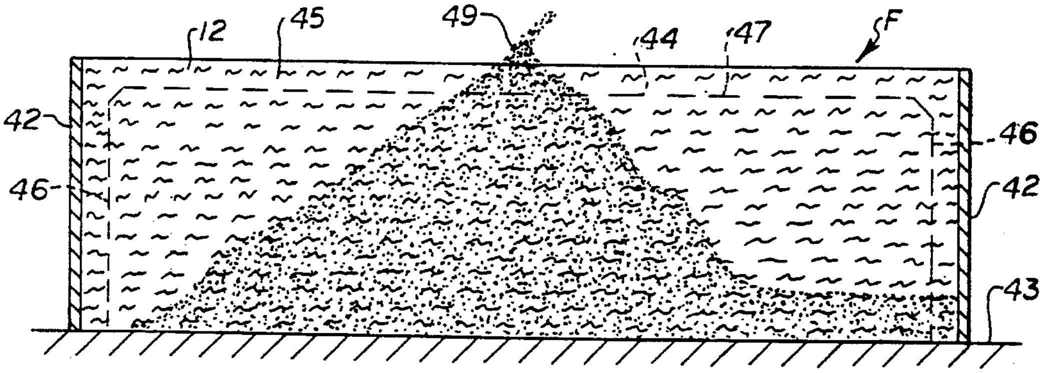

The short fibers of steel, or other organic or inorganic material are sprinkled either by hand or mechanical means into the cavity 45 surrounding the core 44. The form F is completely filled to the top with fibers (FIG. 19). A major consideration for placing the fibers in the form is that they must be allowed to fall freely as individual fibers into the form. This allows the fibers to interlock forming a continuous uniform mass.

Figure 22:
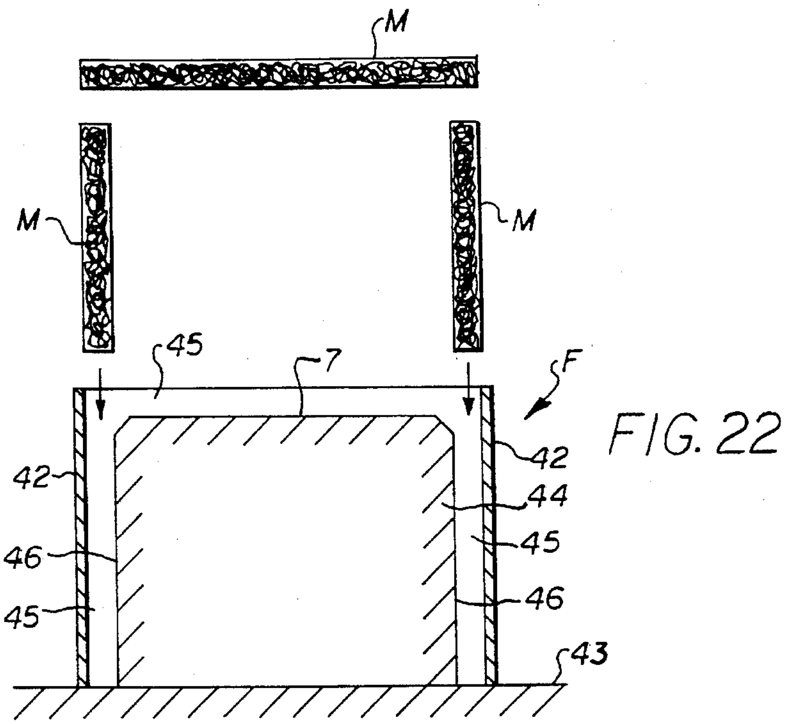

Alternatively, as seen in FIG. 22, one or more blankets or mats M of generally continuous strands of fibrous steel or other organic or inorganic material are placed either by hand or mechanical means into the cavity 45 surrounding the core 44 to completely fill the form F. The fiber mats are placed in the form to form a continuous uniform mass or fiber bed.

Depending upon the geometric properties of the particular fiber being used, and to a lesser degree on the geometry of the form, a specific fiber volume density will be achieved. The preferred fiber volume density is in the range of 3% to 10%.

After the fibers or fiber mats have been placed, the low viscosity cement-based slurry 49 is mixed and infiltrated into the fiber bed, filling the spaces between the fibers (FIG. 19). The cement-based slurry ingredients should be thoroughly mixed to insure that there are no lumps of cement or fly ash which would block the opening in the fiber bed and restrict the infiltration of the cement-based slurry.

Figure 23:
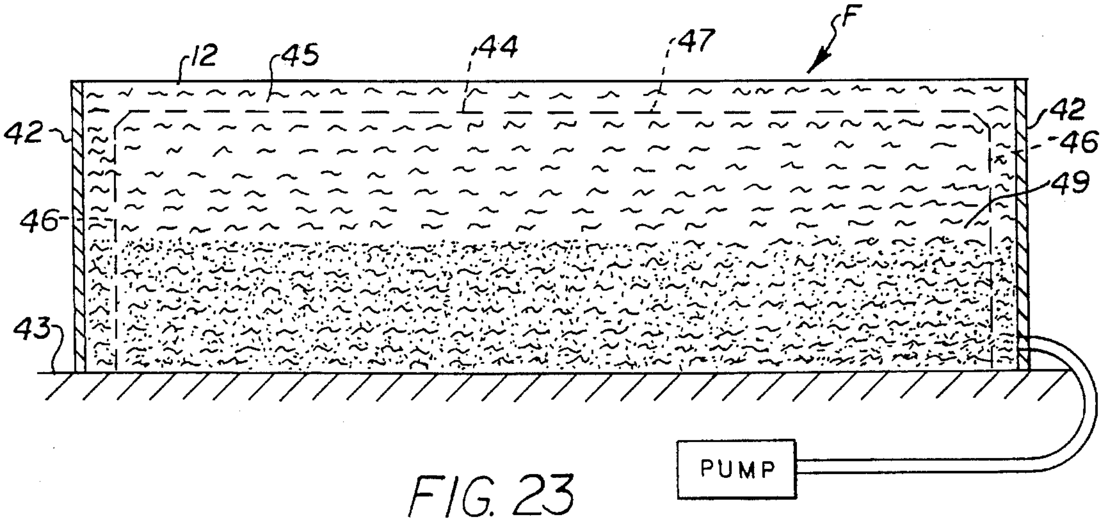

FIG. 19 shows the cement-based slurry being added to the fiber bed by pouring or pumping it into the cavity from the top. However, as shown in FIG. 23, another preferred method is to pump the cement-based slurry mixture under pressure into the lower portion of the cavity to completely infiltrate the spaces between the fibers from the bottom of the bed of fibers to the top thereof and fill the cavity surrounding the core member and above the core member. This method reduces the likelihood of forming voids in the material and facilitates complete infiltration of the fiber bed.

Figure 24:
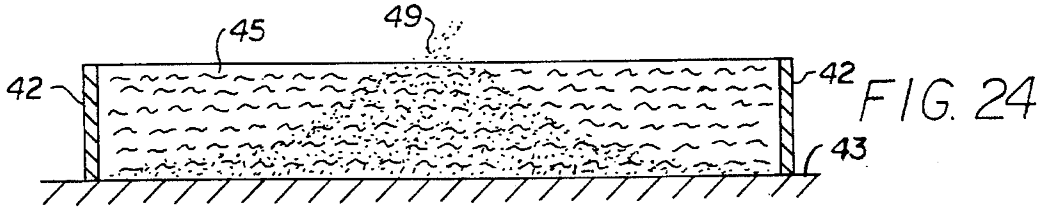
FIG. 24 is a cross section illustrating schematically the method of forming a rectangular structural member.

As shown in FIG. 24, the railroad ties 32, and other rectangular structural members are also formed in a process similar to that described above, except that there is no core member inside the form.

The cement-based slurry mixture proportions can vary, depending upon the desired strength or other physical properties of the finished structure. In addition, form geometry, fiber type, and the particular method of placing the cement-based slurry can also determine certain mixture parameters. Preferred cement—fly ash—sand proportions range from 90-10-0 to 30-20-50, respectively, by weight. The preferred ratio of water to cement plus fly ash is from 0.45 to 0.20 and the amount of superplasticizer is from 0 to 40 ounces per 100 pounds of cement plus fly ash. Due to variations in types of cement, fly ash, and sand in various locales, and the various brands of superplasticizers available, it is advisable to determine the cement-based slurry mix proportions by trial batch methods using the available materials.

The cement-based slurry should remain in a fluid state for a relatively long time sufficient to allow the slurry to flow through and fully infiltrate the fiber bed. If a form vibrator is used, the form is vibrated sufficiently to insure complete infiltration, eliminate voids, and compact the cement-based slurry.

Figure 20:
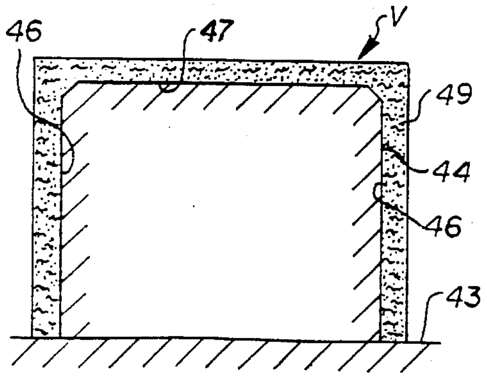

After the concrete has sufficiently cured, the form walls 42 surrounding the core 44 are carefully removed so as not to damage the shape formed thereby (FIG. 20). The curing procedures are the same as for conventional concrete. Depending upon the application, water spray or fogging, wet burlap, waterproof paper, plastic sheeting, or liquid membrane compounds can be used.

Figure 21:
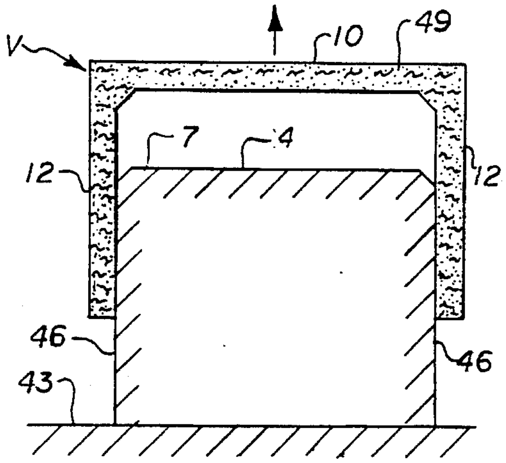

After the structure has cured, it is lifted off the core 44 (FIG. 21). A coating of a penetrating concrete sealer is then applied to all surfaces of the structure. This will also minimize the staining and rusting of the fibers exposed on the surface of embodiments using steel fibers.

Referring now to FIGS. 25 through 28, there is shown a typical mold or form F2 which is used to form a modular panel structure. The form F2 has four side walls 42A made of elongate metal angles 50 having an L-shaped cross section joined together to form a rectangular or square box frame open at the top and bottom ends which is supported on a flat surface 43A. The angles 50 have headed anchor studs 51 extending inwardly toward the frame interior.

The short fibers of steel, or other organic or inorganic material are sprinkled either by hand or mechanical means into the center of the frame form F2. The form F2 is completely filled to the top with fibers (FIG. 26). A major consideration for placing the fibers in the form is that they must be allowed to fall freely as individual fibers into the form. This allows the fibers to interlock forming a continuous uniform mass.

Alternatively, as seen in FIG. 27, one or more blankets or mats M of generally continuous strands of fibrous steel or other organic or inorganic material are placed either by hand or mechanical means into the center of the frame form F2 to completely fill the form F. The fiber mats M are placed in the form to form a continuous uniform mass or fiber bed.

Depending upon the geometric properties of the particular fiber being used, and to a lesser degree on the geometry of the form, a specific fiber volume density will be achieved. The preferred fiber volume density is in the range of 3% to 10%, and in some applications, from 5% to 10%.

After the fibers or fiber mats have been placed, the low viscosity cement-based slurry 49 is mixed and infiltrated into the fiber bed, filling the spaces between the fibers. The slurry ingredients should be thoroughly mixed to insure that there are no lumps of cement or fly ash which would block the opening in the fiber bed and re-strict the infiltration of the slurry. The fiber density and slurry mixture proportions are the same for the individual panels as for the monolithic structure described previously, but may be varied depending upon the desired strength or other physical properties of the finished structure. In addition, form geometry, fiber type, and the particular method of placing the cement-based slurry can also determine certain mixture parameters. The preferred general fiber orientation for the bottom, side, and top panels is in a generally horizontal direction, to resist loadings normal to the plane of the panel.

The cement-based slurry should remain in a fluid state for a relatively long time sufficient to allow the slurry to flow through and fully infiltrate the fiber bed. If a form vibrator is used, the form is vibrated sufficiently to insure complete infiltration, eliminate voids, and compact the cement-based slurry.

After the concrete has sufficiently cured, the angles 50 defining the frame become secured to the concrete and form a metal perimeter surrounding the hard panel P (FIG. 28). The curing procedures are the same as for conventional concrete. Depending upon the application, water spray or fogging., wet burlap, waterproof paper, plastic sheeting, or liquid membrane compounds can be used.

After the panel P has cured, it is lifted off the horizontal surface 43A. A coating of a penetrating concrete sealer is then applied to all surfaces of the structure. This will also minimize the staining and rusting of the fibers exposed on the surface of embodiments using steel fibers. The panels can be easily transported to the installation site where they are placed end-to-end or edge-to-edge with the metal angles on each panel engaged with the angle on the abutting panel and then field welded together to form the enclosure walls.

Figure 29:
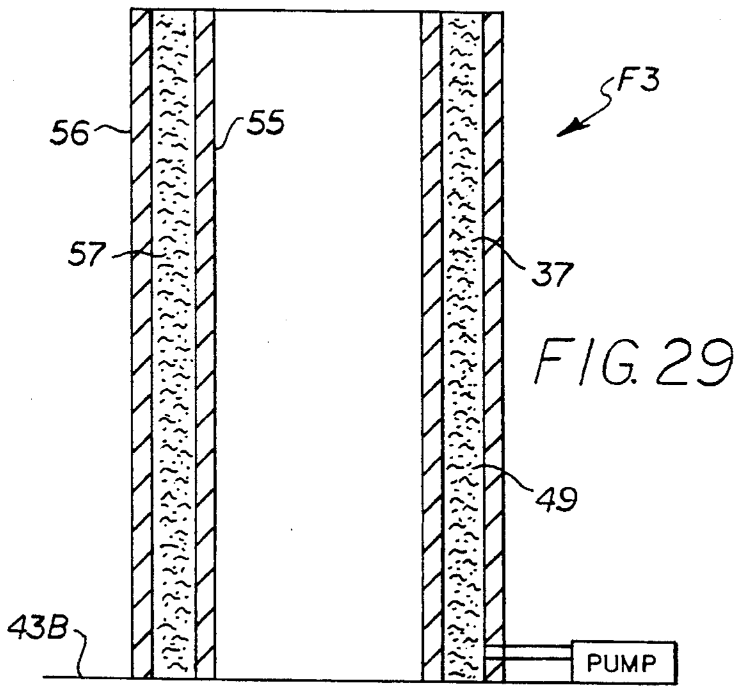
FIG. 29 is a cross section illustrating schematically the method of forming a hollow cylindrical structural member.

Referring now to FIG. 29, there is shown a typical wood or steel mold or form F3 which is used to form a hollow core structure having a continuous side wall 37, such as a hollow column, pole, or pipe construction. The form F3 has an inner cylindrical core member 55 and an outer outer cylindrical wall member 56 open at the top and bottom ends which are supported on a flat surface 43B. The side wall of the outer member 56 is spaced outwardly from the core member 55 to form a cavity or annulus 57 therebetween. Longitudinal reinforcing wires or re-bar may be placed into the cavity and/or steel plates placed at the top or bottom ends of the form. It should be understood that the inner and outer members may be shaped other than cylindrical in cross section and they may be made in sections to facilitate removal of the product after it is formed.

The short fibers of steel, or other organic or inorganic material are sprinkled either by hand or mechanical means into the annulus 57 surrounding the core member 55. The form F3 is completely filled to the top with fibers. A major consideration for placing the fibers in the form is that they must be allowed to fall freely as individual fibers into the form. This allows the fibers to interlock forming a continuous uniform mass.

Alternatively, as described previously, one or more blankets or mats of generally continuous strands of fibrous steel or other organic or inorganic material may be placed either by hand or mechanical means into the annulus 57 surrounding the core member 55 to completely fill the form F3.

After the fibers or fiber mats have been placed, the low viscosity cement-based slurry 49 is mixed and infiltrated into the fiber bed, filling the spaces between the fibers. The cement-based slurry ingredients should be thoroughly mixed to insure that there are no lumps of cement or fly ash which would block the opening in the fiber bed and re-strict the infiltration of the cement-based slurry. The cement-based slurry is added to the fiber bed by pouring or pumping it into the cavity from the top, or by pumping it under pressure into the lower portion of the cavity to completely infiltrate the spaces between the fibers from the bottom of the bed of fibers to the top thereof and fill the cavity surrounding the core member. After the concrete has sufficiently cured, the inner core member 55 and surrounding outer wall 56 are removed.

It should be understood that solid columns, beams, etc. are formed in a process similar to that described above, except that there is no core member inside the form.

RETROFITTING STRUCTURES

Existing conventional structural members such as; structural beams, columns, poles, bridge or highway overpass support beams and columns, pilings for building foundations and piers, etc., may be repaired, reinforced, rehabilitated, or upgraded for siesmic resistance utilizing the present cement-based slurry infiltrated fiber composite material, in a "retrofitting" procedure.

Figure 30:
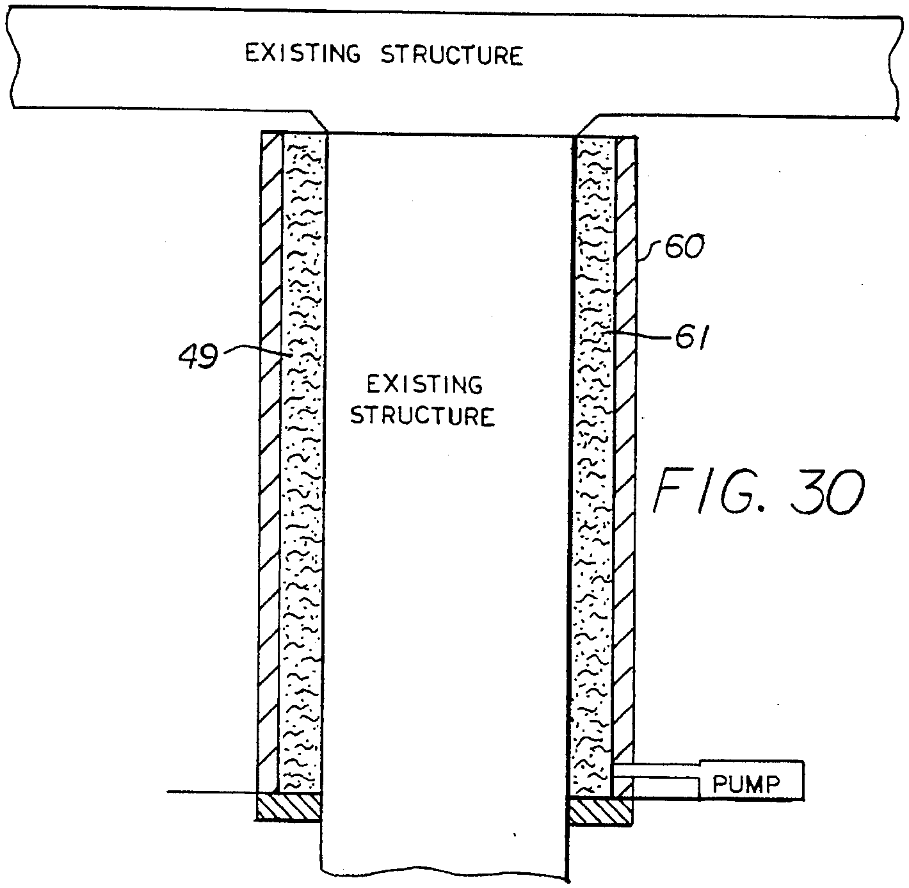
FIG. 30 is a cross section illustrating schematically the method of forming a jacket around an existing structural member.

As shown in FIG. 30, in the retrofitting procedure, a jacket or collar of the cement-based slurry infiltrated fiber composite material is formed around the exterior of the existing beam, column, pole, piling, or pier. This is accomplished by placing an outer member 60"around the structure to be retrofitted such that the side wall of the outer member 60 is spaced outwardly from the structural member to be retrofitted to form a cavity or annulus 61 therebetween. Longitudinal reinforcing wires or re-bar may be placed into the annulus and/or steel plates placed at the top or bottom ends of the form.

The short fibers of steel, or other organic or inorganic material are sprinkled either by hand or mechanical means into the cavity or annulus 61 surrounding the structural member to be retrofitted. The cavity or annulus 61 is completely filled to the top with the fibers which forming a continuous uniform mass. Alternatively, one or more blankets or mats of generally continuous strands of fibrous steel or other organic or inorganic material may be placed either by hand or mechanical means into the cavity or annulus 61 surrounding the structural member to be retrofit to completely fill the annulus.

After the fibers or fiber mats have been placed, the low viscosity cement-based slurry 49 is mixed and infiltrated into the fiber bed, filling the spaces between the fibers. The cement-based slurry ingredients should be thoroughly mixed to insure that there are no lumps of cement or fly ash which would block the opening in the fiber bed and re-strict the infiltration of the cement-based slurry. The cement-based slurry is added to the fiber bed by pouring or pumping it into the cavity from the top, or by pumping it under pressure into the lower portion of the cavity to completely infiltrate the spaces between the fibers from the bottom of the bed of fibers to the top thereof and fill the cavity or annulus 61 surrounding the existing structure. After the concrete has sufficiently cured, the surrounding outer member 60 may be removed, or in some installations, left in place.

The fiber density and slurry mixture proportions are the same for the retrofit structures as for the enclosure structures and structural members described previously, but may be varied depending upon the desired strength or other physical properties of the structure which is retrofitted. In addition, form geometry, fiber type, and the particular method of placing the cement-based slurry can also determine certain mixture parameters.

Preliminary design studies on a cement-based slurry infiltrated fiber composite underground vault system in accordance with the present invention have been conducted by the New Mexico Engineering Research Institute of the University of New Mexico in Albuquerque, N.M. (NMERI). A monolithic vault structure was analyzed as an underground rigid frame using a soil load equivalent to a fluid density of 95 pcf. Because the vault was to be cast as a monolithic unit, special consideration was given to the direction of load application as compared to the orientation of the structural element. The fiber used in this design study was a "Dramix ZL 60/80" fiber, made by Bekaert Wire Company, which was found to produce a SIFCON with the highest ratio of flexural capacities in the two orthogonal directions. The following properties were used in the design:

For vertical elements (load perpendicular to gravity axis):
 Unconfined axial compression: 10,000 psi
 Modulus of rupture: 1,800 psi
 Shear: 3,000 psi For horizontal elements (load parallel to gravity axis):
 Unconfined axial compression: 15,000 psi
 Modulus of rupture: 5,800 psi
 Shear: 4,500 psi It was found that for a cement-based fiber composite structure having the recited material properties, the side wall thickness need only be 4.5" at the bottom and, for economy and as an aid in fabricating the vault, the wall could be tapered to a thickness of 4" at the top of the wall. The required minimum thickness for the bottom wall was calculated to be slightly larger than 4". To allow for any spilled fuel to flow to a low point in the floor, the bottom wall surface can be sloped forward to the sides for a thickness of 4.5" at the corner fillet.

On the other hand, a vault fabricated using conventional pre-stressed concrete would require a wall thickness of 8" to 10" to meet the structural design requirements for resisting these same soil loading conditions.

It can be seen from the foregoing that enclosure structures and structural members formed of the cement-based slurry infiltrated fiber composite material allows the structure to have thinner walls and a gross weight significantly less than conventional reinforced and pre-stressed concrete structures of the same size, and has greater compressive strength, toughness, and ductibility, and a much higher bending capacity approximating that of structural steel.

While this invention has been described fully and completely with special emphasis upon several preferred embodiments, it should be understood that within the scope of the appended claims the invention may be practiced otherwise than as specifically described herein.

I claim:

1. An improved structural member having a wall comprised of a cement-based infiltrated fiber composite material, the improvement comprising;

a structural member having a cement-based infiltrated fiber composite wall section of predetermined length and thickness shaped to enclose or support an object and formed of a preplaced uniform continuous mass of individual interlocked fibers having a fiber volume density in the range of from about 2% to about 25% subsequently completely infiltrated by a cementious matrix mixture by weight of from about 30% to about 90% cement selected from the group consisting of Portland cement and blended cement, from about 10% to about 20% fly ash, water in a ratio of water to the sum of cement and fly ash of from about 0.20 to about 0.45, and a water-reducing superplasticizer in a ratio of superplasticizer to the sum of cement and fly ash of from 0 to about 40 ounces per 100 pounds of the sum of cement and fly ash.

2. The improved structural member according to claim 1, in which said structural member has a cement-based infiltrated fiber composite bottom wall, at least one cement-based infiltrated fiber composite side wall, and a top wall defining an interior volume configured to receive and enclose hazardous materials, explosives, tele-communications equipment, and the like; and said cement-based infiltrated fiber composite bottom wall and said cement-based infiltrated fiber composite side wall each contain a uniform continuous mass of individual interlocked fibers completely infiltrated by and embedded in a cementious matrix mixture of cement, fly ash, water, and a water-reducing superplasticizer and having a fiber volume density in the range of from about 2% to about 25%.

3. The improved structural member according to claim 1, in which said structural member is a hollow configuration and said cement-based infiltrated fiber composite wall section is an annular wall formed of said preplaced uniform continuous mass of individual interlocked fibers in the recited fiber volume density subsequently completely infiltrated by said cementious matrix mixture in the recited ratios.

4. The improved structural member according to claim 3, in which said hollow configuration is formed on the exterior of an existing structural member and said annular wall formed of cement-based infiltrated fiber composite material is of sufficient length and thickness to substantially surround and reinforce the existing structural member on which it is formed.

5. The improved structural member according to claim 1, in which said structural member is a generally cylindrical configuration having a cement-based infiltrated fiber composite wall section of predetermined length and thickness shaped to support an object and formed of said preplaced uniform continuous mass of individual interlocked fibers in the recited fiber volume density subsequently completely infiltrated by said cement-based infiltrated fiber composite material in the recited ratios.

6. The improved structural member according to claim 1, in which said structural member is a generally rectangular configuration of predetermined length and thickness shaped to support an object and formed of cement-based infiltrated fiber composite material.

7. The improved structural member according to claim 1, in which said cement-based infiltrated fiber composite wall section contains a combination of said preplaced uniform continuous mass of individual interlocked fibers in the recited fiber volume density and a plurality of lengths of straight reinforcing wires embedded in said cementious matrix mixture.

8. The improved structural member according to claim 1, in which said blended cement includes ground granulated blast-furnace slag.

9. The improved structural member according to claim 1, in which said structural member is a hollow configuration having an annular wall shaped to surround and conform to the shape of an existing structural member and being of sufficient length and thickness to structurally reinforce the existing structural member which it surrounds.

10. The improved structural member according to claim 1, in which said mass of fibers are selected from the group of materials consisting of metal, steel, glass, plastic, and aramids.

11. The improved structural member according to claim 1, in which said mass of fibers are selected from the group of materials consisting of carbon and boron.

12. The improved structural member according to claim 1, in which each of said individual fibers is approximately 2.36" long and 0.03" in diameter with a deformed end.

13. The improved structural member according to claim 1, in which said cement-based infiltrated fiber composite wall section has a fiber volume density in the range of from about 3% to about 10%.

14. The improved structural member according to claim 1, in which said cement-based infiltrated fiber composite wall section has a fiber volume density in the range of from about 5% to about 10%.

15. The improved structural member according to claim 1, in which said cement-based infiltrated fiber composite wall section is formed of one or more preplaced mats of individual interlocked strands of fibrous material having the recited fiber volume density subsequently completely infiltrated by said cementious matrix mixture in the recited ratios.

16. The improved structural member according to claim 15, in which each fiber strand of said fibrous material mat has a diameter of from about 0.008" to about 0.3".

17. The improved structural member according to claim 15, in which each fiber strand of said fibrous material mat is approximately 0.03" in diameter.

18. The improved structural member according to claim 15, in which each fiber strand of said fibrous material mat has a length of from about 4" to about 30".

19. The improved structural member according to claim 1, in which said cementious matrix mixture includes fine grain sand by weight of from about 1% to about 50%.

20. The improved structural member according to claim 1, in which said cementious matrix mixture includes additives selected from the group consisting of microsilica, latex modifiers, polymers, refractory castables, castable plastics, epoxies, and clay.

21. The improved structural member according to claim 1, in which said cementious matrix mixture includes fine grain sand and additives selected from the group consisting of microsilica, latex modifiers, polymers, refractory castables, castable plastics, epoxies, and clay.

22. The improved structural member according to claim 1, in which said cementous matrix mixture further includes additives selected from the group consisting of microsilica, latex modifiers, polymers, refractory castables, castable plastics, epoxies, and clay.

23. A cement-based infiltrated fiber composite article of manufacture comprising;

at least one wall section of cement-based infiltrated composite material formed of a preplaced uniform continuous mass of individual interlocked fibers selected from the group of materials consisting of steel, plastic, aramids, carbon and boron having a fiber volume density in the range of from about 2% to about 25% subsequently completely infiltrated by a cementious matrix mixture by weight of from about 30% to about 90% cement selected from the group consisting of Portland cement and blended cement, from about 10% to about 20% fly ash, water in a ratio of water to the sum of cement and fly ash of from about 0.20 to about 0.45, and a water-reducing superplasticizer in a ratio of superplasticizer to the sum of cement and fly ash of from 0 to about 40 ounces per 100 pounds of the sum of cement and fly ash.

* * * * *